United States Patent

Jacoby

[11] Patent Number: 6,062,102
[45] Date of Patent: May 16, 2000

[54] STEERING MECHANISM

[76] Inventor: Byron Jacoby, 5299 Cynthia, Dayton, Ohio 45429

[21] Appl. No.: 09/143,508

[22] Filed: Aug. 29, 1998

[51] Int. Cl.[7] ...................................................... B62D 1/04
[52] U.S. Cl. ............................................ 74/557; 74/494
[58] Field of Search ...................... 74/557, 494; D12/177

[56] References Cited

U.S. PATENT DOCUMENTS

| | | | |
|---|---|---|---|
| 2,168,961 | 8/1939 | Ragan | 74/557 |
| 2,305,527 | 12/1942 | Hassett | 74/557 |
| 2,425,055 | 8/1947 | Taylor | 74/557 |
| 2,468,314 | 4/1949 | Vogel | 74/494 |
| 2,746,698 | 5/1956 | Ross | 74/557 |
| 3,282,124 | 11/1966 | Peterson | 74/557 X |
| 5,755,142 | 5/1998 | Jacoby . | |

*Primary Examiner*—Mary Ann Battista
*Attorney, Agent, or Firm*—R. William Graham

[57] ABSTRACT

A steering mechanism for a vehicle includes a steering shaft, a steering wheel having a hub operably connected to an end of the steering shaft and an elongated steering handle rotatably connected to the steering wheel in a manner wherein the steering handle is maintained in a vertical position throughout rotation of the steering wheel.

2 Claims, 6 Drawing Sheets

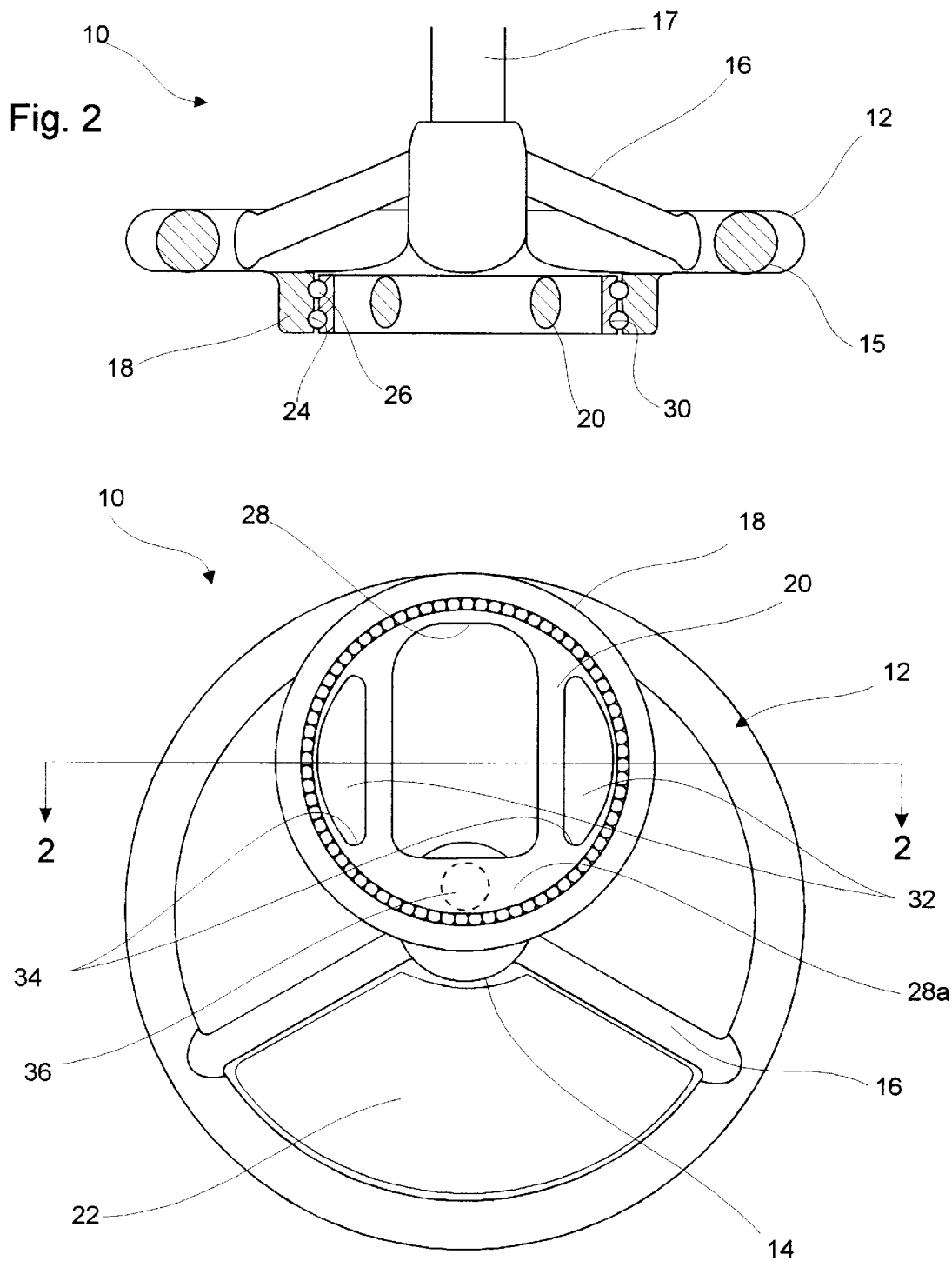

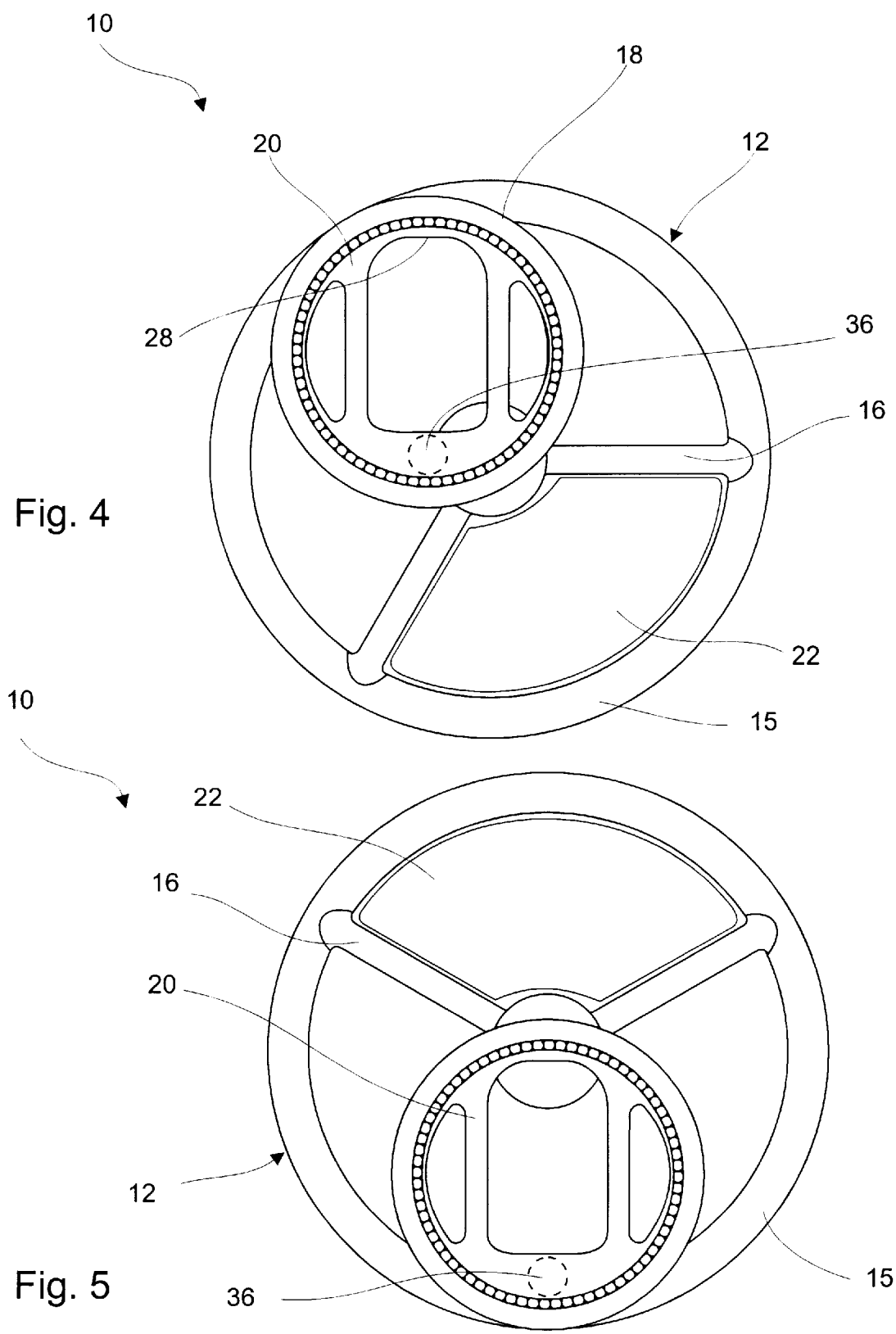

STEERING MECHANISM

BACKGROUND OF THE INVENTION

1. Field of the Invention

The present invention relates to a steering mechanism for vehicles. More particularly, but not by way of limitation the invention relates to a steering mechanism which enables an operator to steer a vehicle with either or both hands continuously grasped to a steering handle of the steering mechanism and in a manner which requires a relatively minimum amount of force and actuation to effectively turn the vehicle and which precludes interference during the steering process.

There have been many attempts to improve steering mechanisms. Most recently, applicant has obtained a patent directed to an improvement of such steering mechanisms in commonly owned U.S. Pat. No. 5,755,142. In said patent, applicant achieves maintaining vertical position of the handles during the steering process without the need for crossing over one's arms.

Some steering mechanisms employ longitudinally displaced handle grips while others employ a conventional wheel configuration. Each steering mechanism usually connects to a centrally located steering shaft with its handle or wheel operably radially displaced from the steering shaft such that when the operator grasps the handle or wheel and effects a turning of the steering shaft, the operator's hands are commonly caused to release prior to a complete rotation of the steering shaft turning the vehicle. This is due in part to the fact that the size of the wheel or displacement of the handle grips must not be so great as to be impractical to the user.

Accordingly, there is a need to improve steering mechanisms such that when the operator is centrally positioned adjacent the steering mechanism he or she can with minimal effort yet increased comfort and safety effectively turn the steering shaft through a complete rotation without the need to remove his or her hands from therefrom. There also remains a need to enable the user to effect such a turn with minimal potential interference while performing the same.

BRIEF SUMMARY OF THE INVENTION

It is an object to improve steering mechanisms.

It is another object to ease steering of a vehicle.

It is yet another object to increase safety of vehicle operation.

Accordingly, the present invention is directed to a steering mechanism for a vehicle having a steering shaft a steering wheel having a hub operably connected to an end of the steering shaft and a steering handle rotatably connected to the steering wheel in a manner wherein the steering handle is maintained in a vertical position throughout rotation of the steering wheel. The steering mechanism further includes a generally cylindrical housing having an inner race surface. The steering handle is formed integrally with the generally circular member and has an outer race surface of a diameter less than the inner race surface of the housing and configured to be operably disposed therein. Bearings are operably disposed between the inner and outer race surfaces. The circular member includes a bottom portion having a weight, for example, to aid in maintaining said handle in a substantially vertical position.

Other objects and advantages will be readily apparent to those skilled in the art upon viewing the drawings and reading the detailed description hereafter.

BRIEF DESCRIPTION OF THE DRAWINGS

FIG. 2 is cross sectional view of the embodiment of FIG. 1 through line 2—2 of FIG. 3.

FIG. 3 is a front view of the embodiment of FIG. 1.

FIG. 4 is a front view of the embodiment of FIG. 1 in a second position.

FIG. 5 is a front view of the embodiment of FIG. 1 in a third position.

DETAILED DESCRIPTION OF THE INVENTION

Figure 1:
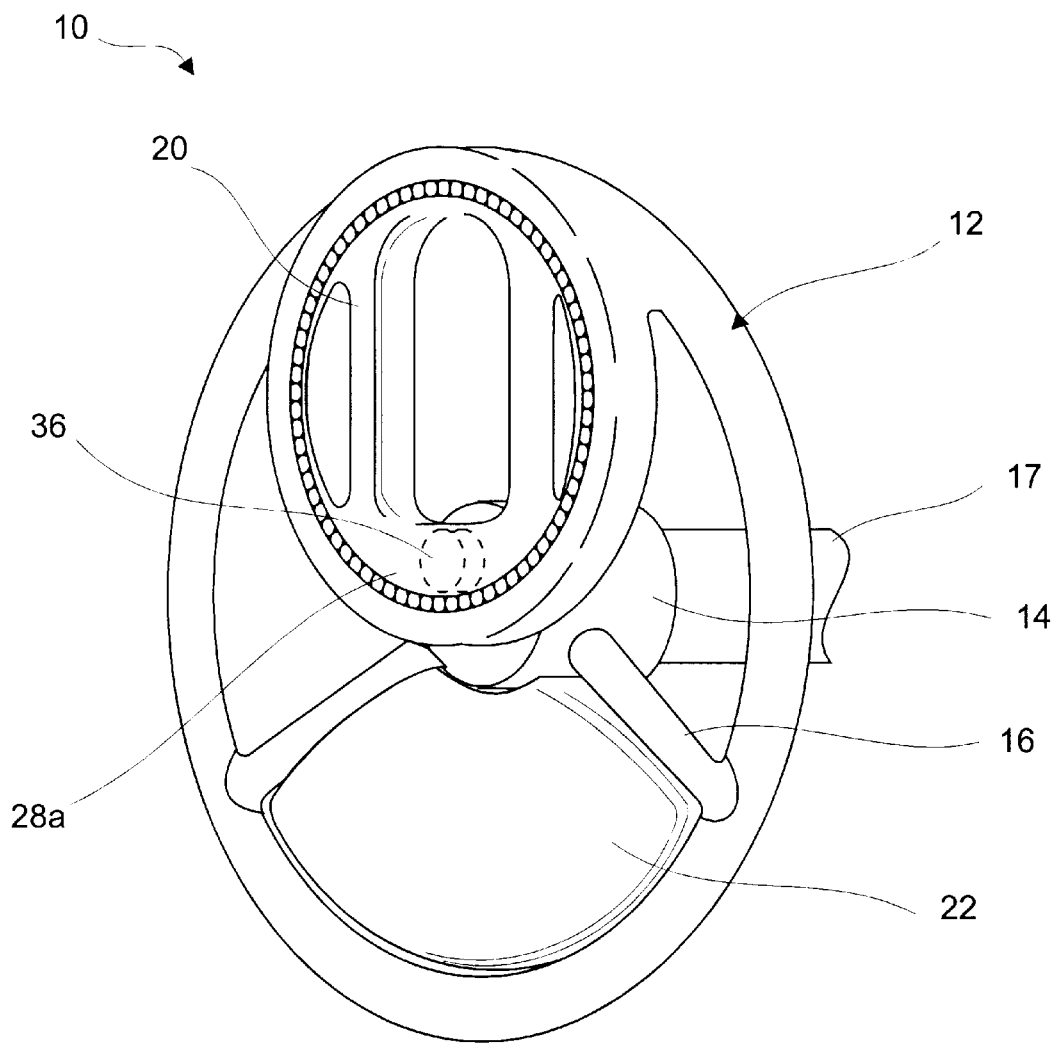
FIG. 1 is a perspective view of an embodiment of the present invention in a first position.

Referring to the drawings, the steering mechanism of the present invention is generally referred to by the numerals 10, 10' and 10". The steering mechanism 10 includes a steering wheel 12 having a hub 14, rim 15 and arms 16 which interconnect the rim 15 and the hub 14. The hub 14 is rigidly connected to a shaft 17 via a splined surface connection as is known in the art. The steering mechanism 10 departs from the art via the inclusion of a housing 18 which is fixedly connected, preferably integrally, to the steering wheel 12 and is shown here as generally located between the hub 14 and rim 15. The steering wheel 12 has steering handle bars 20 rotatably disposed in the housing 18 as described herein below. The steering wheel 12 can be of any suitable structure, preferably of a rigid material and of a configuration to fit within and onto a vehicle dashboard by means readily known to those skilled in the art and may be configured to contain an air bag 22 in a region adjacent to the housing 18. It is contemplated by the inventor that various instrument control panel devices can he integrated into the handle bars 20, such as speed control, clock, radio, phone, air conditioning, etc.

The housing 18 is shown here as generally cylindrical and is preferably configured with a concave race surface 24. The steering handle bars 20 are shown here as formed integrally with a generally circular member 28. An outer race surface 30 is formed on the periphery of the circular member 28. The race surfaces 24 and 30 are configured to receive a portion of bearings 26 thereagainst and aid in ease of rotation of the circular member 28, and in turn handle bars 20, therein. This enables the handle bars 20 to stay in a substantially vertical position as the rim 15 rotates about the shaft 17.

As seen in FIGS. 1–5, the handle bars 20 are sufficiently laterally spaced from one another to accommodate ease of use. The driver's hand is preferably positioned through open surfaces 32 wherein the palm hand may rest in a well 34 of the open surface 32 and the fingers and the thumb of the hand may grip the handle bar 20.

In one embodiment, a bottom portion 28a of the circular member 28 is configured with a weight 36 to aid in maintaining the handle bars 20 in a substantially vertical position.

In this regard, as the steering wheel 12 may come to rest during parking the vehicle at a position other than its starting position, the handle bars 20 will by virtue of the weight 28a be caused to remain in the generally vertical position.

FIGS. 3–5 illustrate the rotational operation of the steering wheel 12 with respect to the handles 20. As the rim 15 is counter-clockwise rotated, for example, by the rotational force applied via the handles 20, the steering shaft 17 is likewise rotated to effect a turn. Note the handle bars 20 can maintain a vertical position as the rim 15 rotates. The rim 15 defines an area through which the handle bars 20 may move unobstructed and prevent a potential interference by an inadvertent obstruction by the user's or passenger's legs or arms, umbrella, cane, etc.

Figure 6:
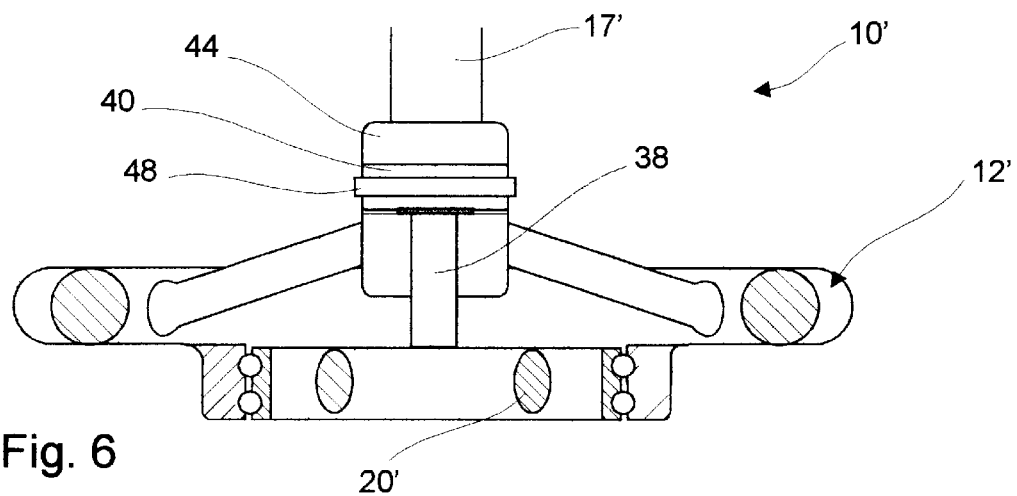
FIG. 6 is cross sectional view of a second embodiment of the present invention through line 6—6 of FIG. 7 attached to a steering shaft.
Figure 7:
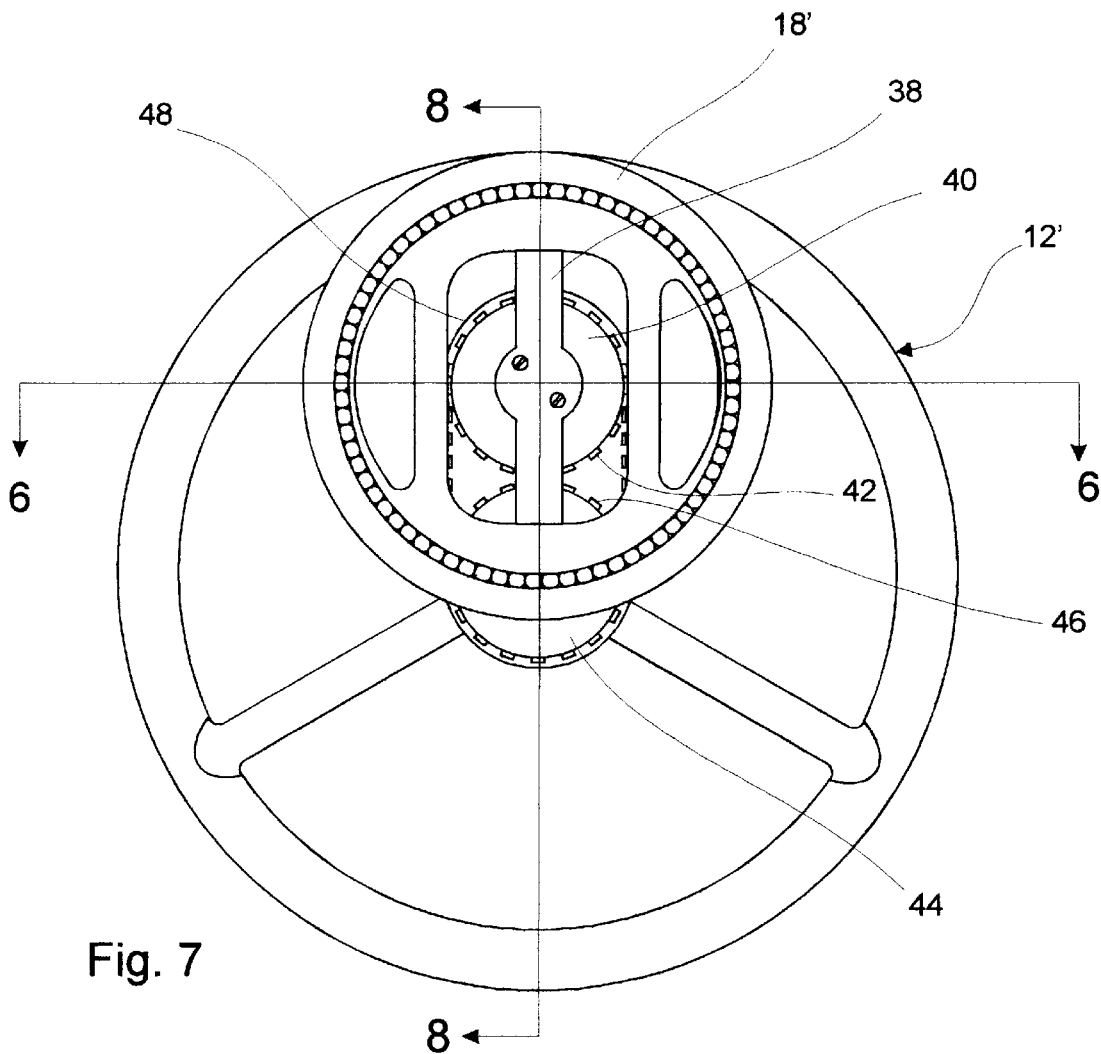
FIG. 7 is a front view of the embodiment of FIG. 6 of the present invention
Figure 8:
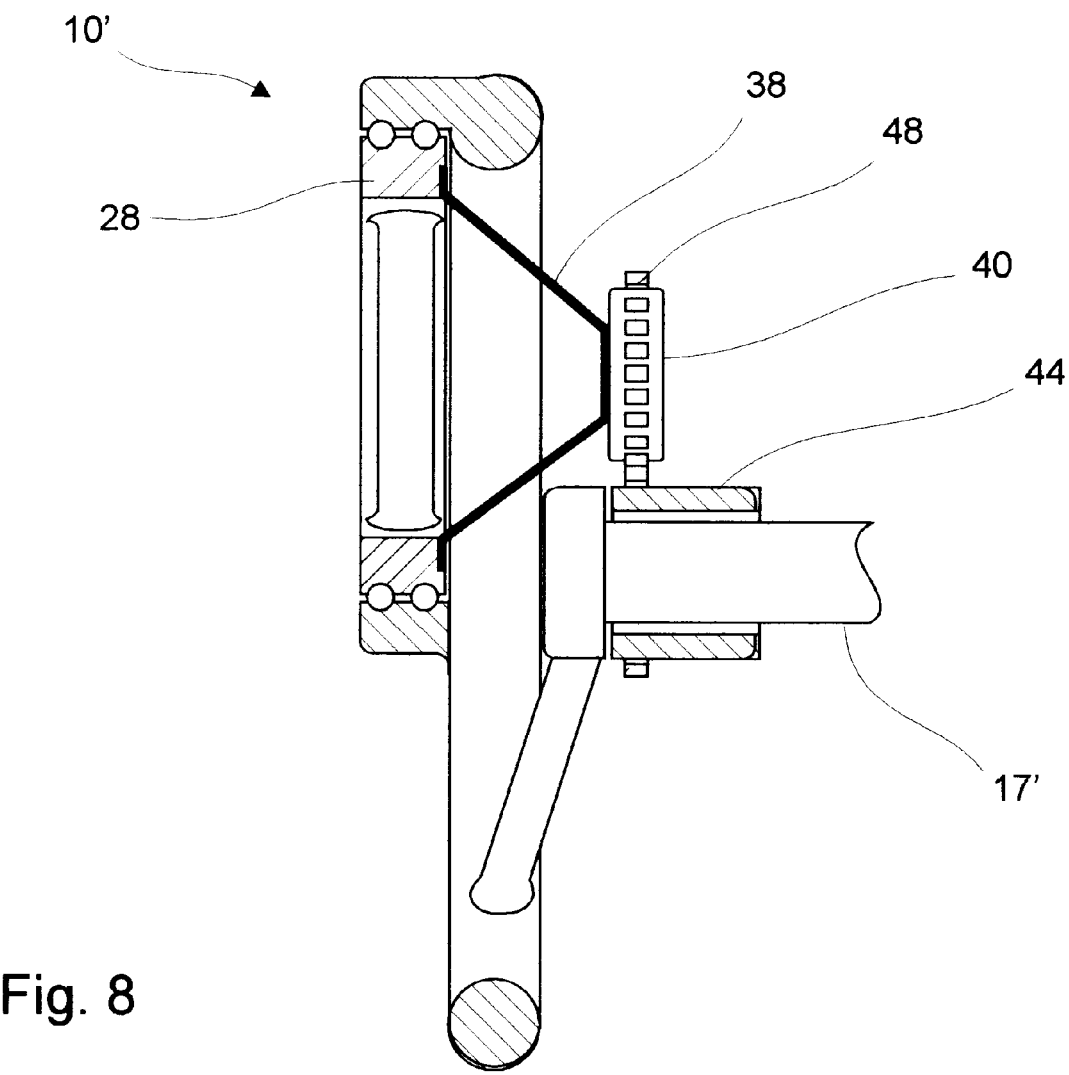
FIG. 8 is a cross sectional view of the embodiment of FIG. 6 through line 8—8 of FIG. 7 attached to a steering shaft.

FIGS. 6–8 illustrate the invention in another embodiment. Here, the handles 20 are positively maintained in a vertically fixed position throughout rotation via an arm 38 attached to the circular member 28'. The arm 38 is attached to a hub 40 of a gear 41 having plurality of teeth 42 on the periphery thereof. A cylindrical gear sleeve 44 is disposed about the shaft 17' and likewise has teeth 46. A belt 48 having a plurality of recess surfaces 47 adapted to receive teeth 42 and 46 is operably disposed about the gear 41 and gear sleeve 44 and works to maintain the handles 20' in a vertical position throughout rotation once placed thereon.

Figure 9:
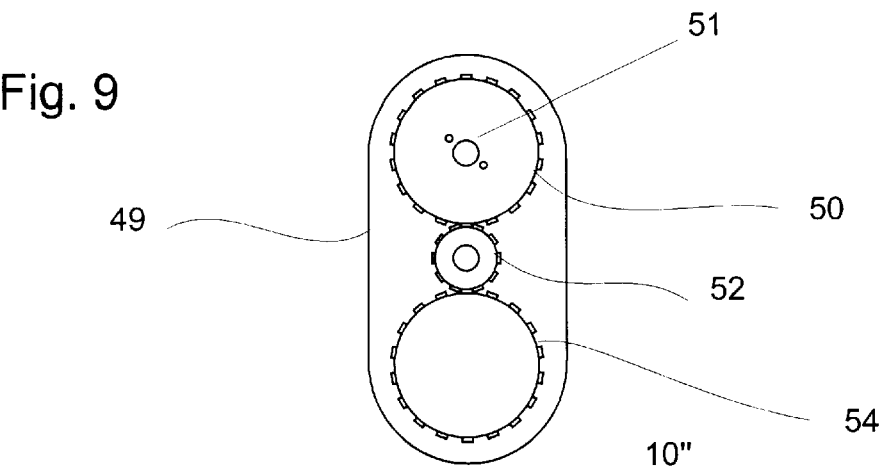
FIG. 9 shows still another part for use with a third embodiment shown in FIG. 10.
Figure 10:
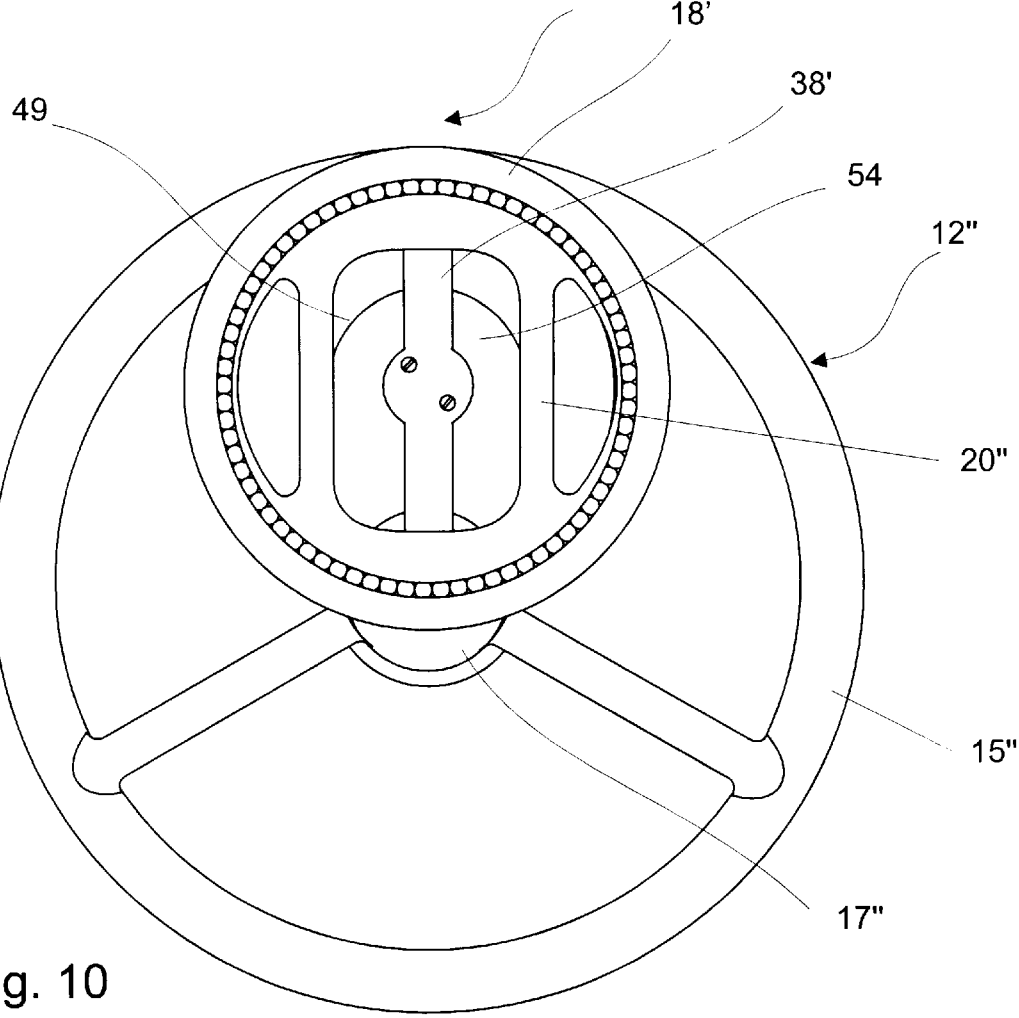
FIG. 10 shows the third embodiment of the present invention.

In yet another embodiment depicted in FIG. 10, the vertical positioning is maintained by way of interconnecting gears 50, 52 and gear sleeve 54 shown in FIG. 9. Here, the gears 50, 52 and gear sleeve 54 are covered with a housing 49. An arm 38' is attached to a hub 51 of the gear 50. Gear sleeve 54 is configured to be disposed about the shaft 17". The gear 52 interposed between the gear 50 and gear sleeve 54 is sized in relation to the size of the gear 50 and gear sleeve 54 in order to maintain the handle bars 20" in the vertical position. It is contemplated that the gear sizes may vary, yet carry out the intention of the present invention.

The above described embodiments are set forth by way of example and are not for the purpose of limiting the present invention. It will be readily apparent to those skilled in the art that obvious modifications and variations can be made to the embodiments without departing from the scope of the invention. Accordingly, the claims appended hereto should be read in their full scope including any such modifications and variations.

What is claimed is:

1. A steering mechanism for a vehicle, including:

a steering shaft;

a steering wheel having a hub operably connected to an end of the steering shaft;

a pair of generally vertically disposed steering handle bars rotatable connected to said steering wheel in a manner wherein said steering handle bars are maintainable in a vertical position throughout rotation of the steering wheel wherein said steering wheel includes a generally cylindrical housing disposed thereon having an inner race surface, wherein said steering handle bars are disposed within a generally circular member having an outer race surface of a diameter less than said inner race surface of said housing and configured to be rotatable disposed therein, an arm having a first end connected to said handle bars, means interconnecting a second end of said arm and said steering shaft for controllably maintaining said handle bars in said vertical position, wherein said controllably maintaining means includes a gear having a hub rotatably connected to said second end of said arm, a complimentary gear sleeve disposed on said steering shaft and means interconnecting said gear and said gear sleeve for coordinating rotation thereof in a manner which causes rotation of said arm about said steering shaft and maintains said handle bars in said vertical position.

2. The steering mechanism of claim 1, wherein said coordination means includes a second gear interconnecting said gear and said gear sleeve.

* * * * *